United States Patent
Habeebullah et al.

(10) Patent No.: US 8,992,843 B2
(45) Date of Patent: Mar. 31, 2015

(54) CATALYTIC CONVERTER FOR CONFINED AREAS

(71) Applicant: Umm Al-Qura University, Makkah (SA)

(72) Inventors: Turki Mohammed Abdulkareem Habeebullah, Makkah (SA); Atef Mohamed Fathy Mohamed, Makkah (SA); Ibrahim Hussein Abd El-Rahim, Makkah (SA)

(73) Assignee: Umm Al-Qura University, Makkah (SA)

( * ) Notice: Subject to any disclaimer, the term of this patent is extended or adjusted under 35 U.S.C. 154(b) by 213 days.

(21) Appl. No.: 13/736,004

(22) Filed: Jan. 7, 2013

(65) Prior Publication Data

US 2014/0193307 A1    Jul. 10, 2014

(51) Int. Cl.
  *F01N 3/10*     (2006.01)
  *B01D 53/94*    (2006.01)
  *B01D 53/88*    (2006.01)

(52) U.S. Cl.
  CPC ............ *B01D 53/9431* (2013.01); *B01D 53/88* (2013.01); *B01D 53/9418* (2013.01); *B01D 2251/2067* (2013.01); *B01D 2255/1021* (2013.01); *B01D 2255/1023* (2013.01); *B01D 2255/1025* (2013.01); *B01D 2259/4508* (2013.01); *Y02T 10/24* (2013.01)
  USPC ........................................................ 422/174

(58) Field of Classification Search
  CPC ................... B01D 53/9431; B01D 2251/2067; B01D 2255/1023; B01D 2259/4508; B01D 53/88
  USPC ........ 422/174, 179, 177, 168; 55/523; 60/320
  See application file for complete search history.

(56) References Cited

U.S. PATENT DOCUMENTS

| | | | | |
|---|---|---|---|---|
| 5,465,573 | A * | 11/1995 | Abe et al. | 60/274 |
| 2003/0037550 | A1* | 2/2003 | Fassbender | 60/772 |
| 2005/0159309 | A1 | 7/2005 | Hubbell et al. | |
| 2010/0061906 | A1* | 3/2010 | Buschmann et al. | 423/239.1 |
| 2011/0174196 | A1 | 7/2011 | Murray et al. | |
| 2012/0129684 | A1 | 5/2012 | Vimont et al. | |
| 2013/0014496 | A1* | 1/2013 | Fogg | 60/320 |

FOREIGN PATENT DOCUMENTS

JP         8-303200        11/1996

* cited by examiner

*Primary Examiner* — Tom P Duong
(74) *Attorney, Agent, or Firm* — Richard C. Litman

(57) ABSTRACT

The catalytic converter for confined areas is installed with a vehicular tunnel, parking garage, or other confined area subject to motor vehicle operation therein. The converter catalyzes internal combustion engine exhaust by-products by selective catalytic reduction. The heat required for the catalytic reaction is provided by an electric heater installed with the converter, the converter being thermally insulated to retain the heat. The carbon dioxide and water vapor resulting from the catalytic reactions are gathered by the same fan or pump and the water vapor condensed to liquid form, and distributed to vegetation external to and adjacent to the tunnel or enclosure.

8 Claims, 2 Drawing Sheets

CATALYTIC CONVERTER FOR CONFINED AREAS

BACKGROUND OF THE INVENTION

1. Field of the Invention

The present invention relates generally to devices and systems for the treatment of air pollution, and particularly to a catalytic converter for confined areas, such as tunnels, parking garages, and the like.

2. Description of the Related Art

The adverse effects of exhaust by-products resulting from the operation of internal combustion engines have been known for some time. Numerous illnesses and deaths have occurred as a result of excessive atmospheric pollution due to motor vehicle operation in heavily populated areas. As a result, a great deal of research has gone into the development of some means of reducing or eliminating these pollutants. A number of different systems and principles were developed. The most effective has been the catalytic converter that is now installed in the exhaust systems of most motor vehicles. These catalytic converters use rare earth elements and precious metals, such as platinum, palladium, and rhodium, to catalyze the oxides of nitrogen, carbon monoxide, and unburned hydrocarbons in the untreated exhaust of an internal combustion engine without being consumed themselves.

While this system has proven quite effective in reducing air pollution, no catalytic converter or other exhaust treatment is one hundred percent efficient. There are still some untreated exhaust by-products that escape from the exhaust of any internal combustion engine. The overwhelming majority of such untreated exhaust by-products is dissipated into the atmosphere, where their relatively tenuous dispersal does little or no harm. However, it is a different matter when internal combustion engines are operated within an enclosed area, such as a vehicular tunnel, parking garage, etc. Even the relatively small amounts of untreated exhaust residue escaping from the operating vehicles can result in an excessive buildup of pollutants in the enclosed space, unless something is done to reduce those pollutants.

Accordingly, various efforts have been made to reduce exhaust pollution in enclosed areas. Perhaps the most common means used is the installation of large fans to draw the air (and pollutants therein) from the enclosed space for dissipation in the atmosphere, accompanied by fresh air drawn in or blown in by the fans. While this may suffice to reduce pollution within the enclosed area to an acceptable degree, the fact remains that the pollutants remain in the atmosphere outside the enclosed area.

Further efforts have been made to reduce vehicular pollution in enclosed areas by installing various devices to catalyze the pollutants or to filter them from the air. While these efforts are commendable, these systems either release the treated by-products into the air or capture the untreated pollutants in filters that must be cleaned or changed periodically.

Japanese Patent Publication No. 8-303,200 published Nov. 19, 1996 to Ishikawajima Harima Heavy Industries describes (according to the drawings and English abstract) a system for decomposing sulfur oxides and nitrogen oxides from vehicular exhaust gases in a vehicle tunnel. The system also filters dust and removes moisture from the air.

None of the above inventions and patents, taken either singly or in combination, is seen to describe the instant invention as claimed. Thus, a catalytic converter for confined areas solving the aforementioned problems is desired.

SUMMARY OF THE INVENTION

The catalytic converter for confined areas is installed in the roof of a vehicular tunnel or other confined area to draw air and entrained exhaust pollutants into the converter for conversion to harmless substances. The converter preferably extends for substantially all of the length of the tunnel in order to treat the maximum amount of air from the tunnel. The converter uses a selective catalytic reduction process to convert $NO_x$ and hydrocarbons from vehicle emissions into nitrogen and carbon dioxide. The converter is housed in a ceramic tube to provide thermal insulation. A pump at the inlet injects urea into the flow of vehicle exhaust gases. The urea and entrained exhaust gases are deposited on catalytic electrodes made from platinum, palladium, rhodium, or other precious metals, which provide catalytic conversion of $NO_x$ and hydrocarbons to nitrogen and carbon dioxide. An electric heating element maintains the temperature inside the tube between 200-300° C. A pump at the outlet may direct water and carbon dioxide products of the catalytic conversion to plants outside the confined area to foster botanical growth.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The catalytic converter for confined areas serves to draw air and any pollutants therein from the confined area, catalyze the pollutants in the air, condense water vapor formed as a result of the catalytic reaction, and distribute the water vapor, carbon dioxide, and other harmless products of the catalytic reaction to vegetation external to the confined area. The confined area may comprise a motor vehicle tunnel, a parking garage, or similar area in which the escape of exhaust gases from motor vehicles operating therein is restricted.

Figure 1:
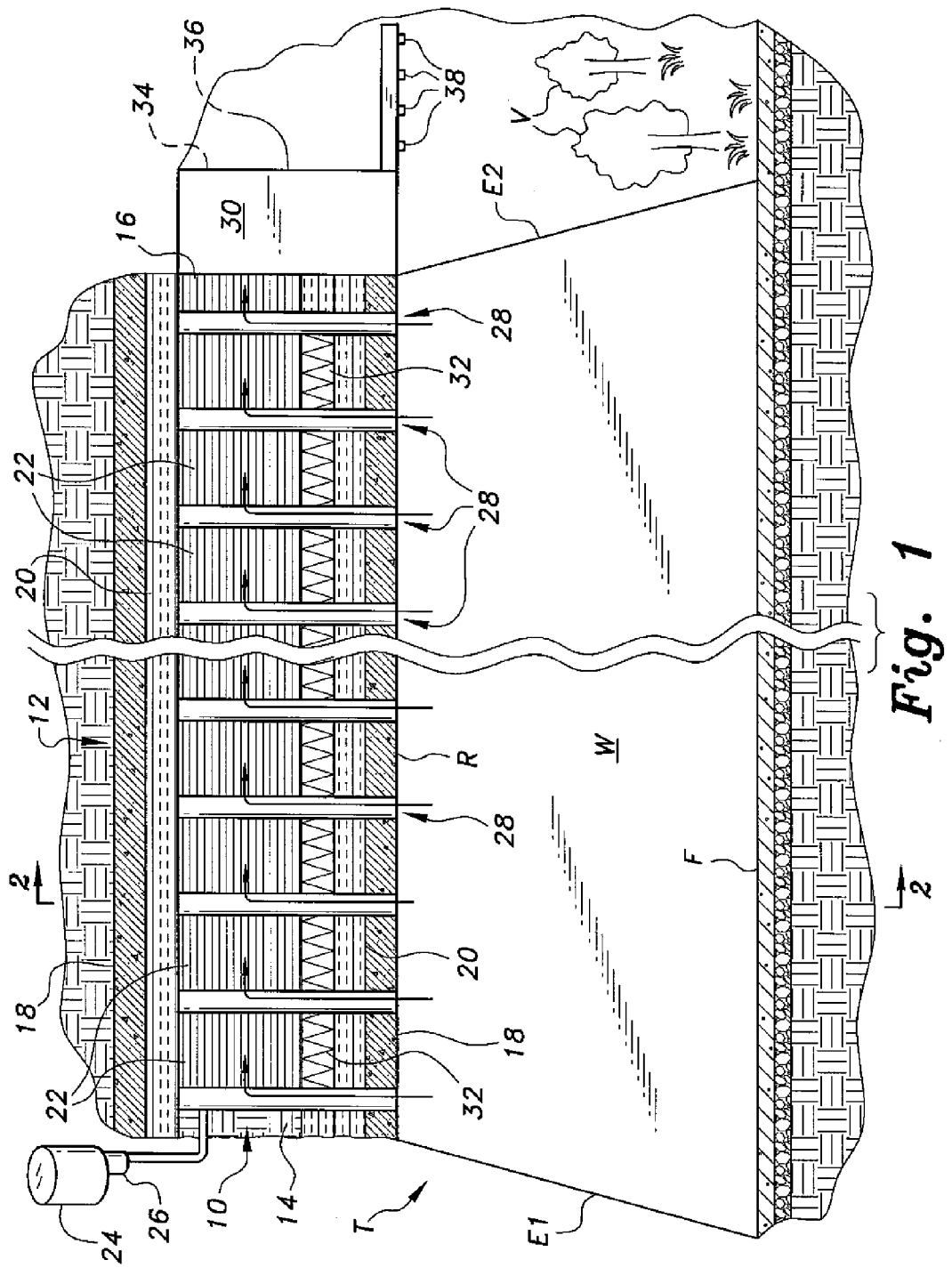
FIG. 1 is a side elevation view in section of an exemplary vehicular tunnel incorporating the catalytic converter for confined areas according to the present invention, illustrating its various features.

FIG. 1 of the drawings provides a side elevation view in section of an exemplary tunnel T for motor vehicles. The tunnel T is generally conventional, except for the installation of the catalytic converter for confined areas therein. The tunnel T has a first end E1, an opposite second end E2, a floor or roadway surface F, walls W, and a roof or ceiling R, comprising a substantially closed, stationary structure with the exception of the two open ends E1 and E2. Essentially the same elements apply to a motor vehicle parking garage, and it will be seen that the catalytic converter for confined areas may be applied to such a parking garage or similar structure.

Figure 2:
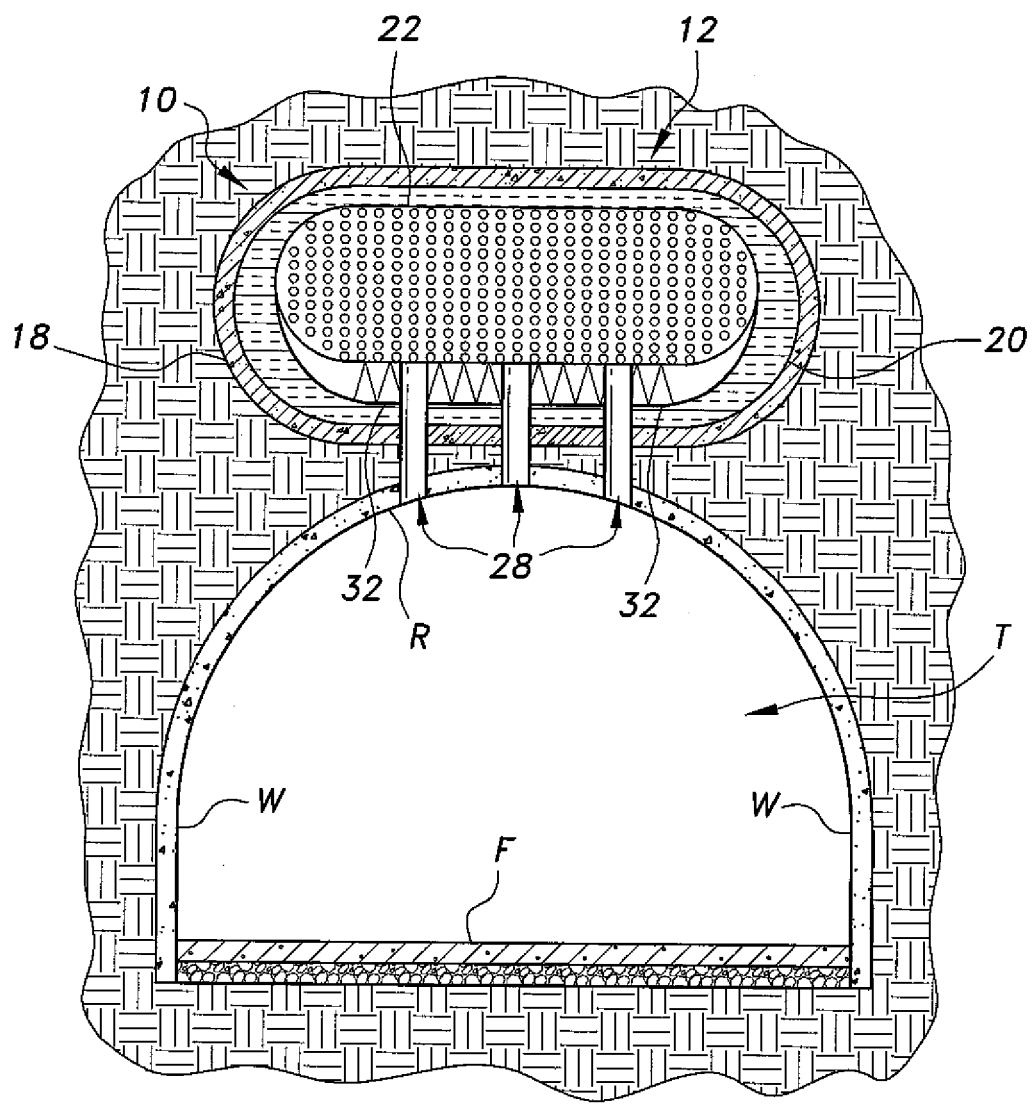
FIG. 2 is a section view along lines 2-2 of FIG. 1.

The present catalytic converter 10 is preferably installed above or at the roof or ceiling R of the tunnel or confined area T, as shown in FIGS. 1 and 2. The converter 10 may be installed to the side of the tunnel T or beneath the tunnel floor F, if desired. However, the converter system installation is preferably located above the tunnel T, as the vehicle exhaust gases are somewhat warmer than ambient and will tend to rise. In this manner, the energy required for exhaust fans will be minimized.

The catalytic converter 10 includes a housing 12 having a substantially closed first end 14 and an opposite outlet end 16. The housing 12 is a tube formed of an outer ceramic shell 18 and thermal insulation 20 disposed between the ceramic shell 18 and the central core, which has a plurality of catalytic converter elements 22. The tube or housing 12 may have an inner wall made from an alloy of iron, chromium, and aluminum. The catalytic converter 10 uses a selective catalytic reduction process. Urea in solution, which may be stored in a tank, is pumped through the housing 12 by a pump 24 at the first end so that vehicle exhaust gases or other pollutants in the tunnel T are entrained in the urea. A preferred source of the urea is AdBlue, which comprises about 32.5% high quality urea dissolved in distilled water. The urea, with the entrained exhaust gases, comes into contact with the catalytic converter elements 22, which are electrodes that may be solid plates or honeycombed plates of conventional construction that have a coating of platinum, palladium, rhodium, or other precious metals that are known to act as catalysts in the conversion of motor vehicle exhaust gases to harmless byproducts. The nitrogen oxides ($NO_x$) in the exhaust gases are reduced to nitrogen, water, and carbon dioxide by the following reaction:

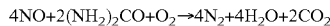

$$4NO+2(NH_2)_2CO+O_2 \rightarrow 4N_2+4H_2O+2CO_2$$

Hydrocarbons and other volatile organic compounds in the vehicle exhaust gas are also converted to carbon dioxide and water by contact with the precious metal catalyst in conventional manner.

A plurality of inlet passages 28 extend from the tunnel T into the housing 12 (or the housing 12 may have pores defined therein) above the level of the urea being pumped between the two ends 14 and 16 thereof, allowing the air and exhaust gas volume within the confined area of the tunnel T to communicate with the catalytic converter elements 22. The passages 28 may have filters disposed therein to prevent dust particles from entering the converter 10. A conventional mechanism 30, e.g., a fan or fans, etc., is provided to draw air and exhaust gases from the tunnel T, through the inlet passages 28, into the catalytic converter elements 22, and exhaust those gases from the catalytic converter system 10.

Conventional catalytic converter materials require a great deal of heat for their operation. Accordingly, the catalytic converter 10 includes at least one electric heating element 32, and preferably a plurality of such elements 32, disposed within the housing 12 and adjacent to the catalytic converter elements 22, the electric heating elements 32 extending substantially from the first end to the second end of the housing 12. The heating elements 32 are preferably immediately adjacent to the catalytic converter elements 22, enclosed within the thermal insulation 20 and ceramic shell 18 with the catalytic converter elements 22 in order to maximize heating efficiency of the elements 22. Electrical power for the heating elements 32 may be provided by any suitable conventional means. The heating elements 32 maintain the temperature in the housing between about 200-300° C. (473-573), which is sufficient heat to carry out selective catalytic reduction, so long as the residence time of the urea with the entrained exhaust gas inside the housing 12 is long enough.

Further processing of the exhaust gas byproducts produced by the catalytic converter elements 22 results in substances that may be used to enhance nearby vegetation, rather than merely releasing those by-products to the atmosphere. These exhaust gas by-products include, but are not limited to, water vapor and carbon dioxide. Accordingly, the system 10 includes a conventional water vapor condenser 34 and pump 36 to distribute the liquefied water and carbon dioxide from the processed exhaust emissions to a dispensing system 38 (e.g., spray nozzles, etc.) to an adjacent area of vegetation V (e.g., trees, grass, shrubs, etc.) external to the tunnel T or other confined area. In this manner, the health of such nearby vegetation V is enhanced, rather than being harmed by otherwise harmful exhaust emissions.

It is to be understood that the present invention is not limited to the embodiments described above, but encompasses any and all embodiments within the scope of the following claims.

We claim:

1. A catalytic converter for installation with a confined area, the confined area comprising a fixed, stationary structure containing exhaust gases from motor vehicle operations therein, the catalytic converter comprising:
    a housing, the housing comprises a ceramic shell, a central core and thermal insulation disposed therebetween, the housing having an outlet end opposite the first end, and a plurality of inlet passages disposed between the first end and the outlet end, the inlet passages communicating with the confined area and being in fluid communication with the central core, the housing being adapted for installation within the confined area;
    a reservoir containing urea in aqueous solution;
    a pump connected between the reservoir and the first end of the housing, the pump being configured for pumping the urea solution through the central core of the housing;
    a plurality of catalytic converter elements disposed within the central core of the housing; and
    at least one electric heating element disposed within the central core of the housing, the heating element being configured for maintaining a temperature between 200° and 300° C. within the housing;
    wherein the catalytic converter is adapted for selective catalytic reduction of nitrogen oxides and hydrocarbon pollutants in vehicle exhaust emissions entering the central core of the housing through the inlet passages.

2. The catalytic converter for a confined area according to claim 1, further comprising:
    a condenser disposed adjacent the outlet end, the condenser condensing liquid water from water vapor produced by the selective catalytic reduction of the vehicle emissions; and
    a pump adjacent the outlet end for pumping carbon dioxide produced by the selective catalytic reduction of the vehicle emissions and the condensed water to vegetation adjacent the confined area.

3. The catalytic converter for a confined area according to claim 1, wherein said housing comprises an elongated tubular structure.

4. The catalytic converter for a confined area according to claim 1, wherein the catalytic converter elements have a coating of a precious metal selected from the group consisting of platinum, palladium, and rhodium.

5. A confined area, comprising:
    an elongated motor vehicle tunnel; and
    a selective catalytic reduction converter disposed in the tunnel, the converter having a plurality of air inlets for the passage of motor vehicle emissions into the converter for the reduction of NOx and volatile hydrocarbons in the tunnel, wherein said selective catalytic reduction converter comprises:
    a housing, the housing comprises a ceramic shell, a central core and thermal insulation disposed therebetween, the housing having an outlet end opposite the first end, the plurality of inlet passages being disposed between the first end and the outlet end, the inlet passages communicating with the vehicle tunnel and being in fluid communication with the central core;
    a reservoir containing urea in aqueous solution;

a pump connected between the reservoir and the first end of the housing, the pump being configured for pumping the urea solution through the central core of the housing;

a plurality of catalytic converter elements disposed within the central core of the housing; and at least one electric heating element disposed within the central core of the housing, the heating element being configured for maintaining a temperature between 200° and 300° C. within the housing;

wherein the catalytic converter is adapted for selective catalytic reduction of nitrogen oxides and hydrocarbon pollutants in vehicle exhaust emissions entering the central core of the housing through the inlet passages.

6. The catalytic converter for a confined area according to claim 5, further comprising:

a condenser disposed adjacent the outlet end, the condenser condensing liquid water from water vapor produced by the selective catalytic reduction of the vehicle emissions; and a pump adjacent the outlet end for pumping carbon dioxide produced by the selective catalytic reduction of the vehicle emissions and the condensed water to vegetation adjacent the confined area.

7. The catalytic converter for a confined area according to claim 5, wherein said housing comprises an elongated tubular structure.

8. The catalytic converter for a confined area according to claim 5, wherein the catalytic converter elements have a coating of a precious metal selected from the group consisting of platinum, palladium, and rhodium.

* * * * *